(12) United States Patent
Chu et al.

(10) Patent No.: US 9,236,081 B1
(45) Date of Patent: Jan. 12, 2016

(54) LASER TEMPERATURE CALIBRATION IN A HAMR DEVICE

(71) Applicant: Seagate Technology LLC, Cupertino, CA (US)

(72) Inventors: Alfredo S. Chu, Prior Lake, MN (US); Jason W. Riddering, Prior Lake, MN (US); Drew M. Mader, Bloomington, MN (US); Huazhou Lou, Eden Prairie, MN (US); Pu-Ling Lu, Rosemount, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/674,360

(22) Filed: Mar. 31, 2015

(51) Int. Cl.
*G11B 11/00* (2006.01)
*G11B 7/1267* (2012.01)
*G11B 11/105* (2006.01)
*G11B 7/1263* (2012.01)
*G11B 7/12* (2012.01)
*G11B 5/48* (2006.01)
*G11B 5/60* (2006.01)

(52) U.S. Cl.
CPC ............ *G11B 7/1267* (2013.01); *G11B 7/1206* (2013.01); *G11B 7/1263* (2013.01); *G11B 11/10595* (2013.01); *G11B 5/4866* (2013.01); *G11B 5/6088* (2013.01)

(58) Field of Classification Search
CPC .. G11B 7/1267; G11B 7/1206; G11B 7/1263; G11B 5/127; G11B 5/4866; G11B 2005/0021; G11B 5/6088; G11B 13/08; G11B 5/314; G11B 5/455; G11B 5/607; G11B 11/10554; G11B 11/10595

USPC ..................... 369/13.33, 13.13, 112.27, 13.27
See application file for complete search history.

(56) References Cited

U.S. PATENT DOCUMENTS

| | | | |
|---|---|---|---|
| 6,671,232 B1 | 12/2003 | Stupp | |
| 8,391,107 B2 | 3/2013 | Gage et al. | |
| 8,406,090 B2 | 3/2013 | Juang et al. | |
| 8,451,696 B2 | 5/2013 | Huang et al. | |
| 8,854,929 B1 | 10/2014 | Champion et al. | |
| 8,897,103 B2 | 11/2014 | Alex | |
| 8,908,481 B1 * | 12/2014 | Miyamoto | G11B 5/314 369/13.33 |
| 2012/0275279 A1 | 11/2012 | Wilson et al. | |

FOREIGN PATENT DOCUMENTS

EP 0548111 B1 9/1997

OTHER PUBLICATIONS

U.S. Appl. No. 14/278,386, filed May 15, 2014, 26 pages.
U.S. Appl. No. 14/278,377, filed May 15, 2014, 25 pages.
U.S. Appl. No. 14/688,049, filed Apr. 16, 2015, 26 pages.

* cited by examiner

*Primary Examiner* — Ali Neyzari
(74) *Attorney, Agent, or Firm* — Leanne Taveggia Farrell; Westman, Champlin & Koehler, P.A.

(57) ABSTRACT

A method includes setting a heat assisted magnetic recording (HAMR) device located in a data storage system having a laser to an operating temperature. A threshold laser current is determined. An optimal laser current is determined. The threshold laser current and the optimal laser current are stored in memory. The steps of determining a threshold laser current, determining an optimal laser current and storing the threshold laser current and the optimal laser current into the calibration table are repeated until acceptable device performance is achieved at more than one operating temperature.

20 Claims, 8 Drawing Sheets

LASER TEMPERATURE CALIBRATION IN A HAMR DEVICE

SUMMARY

A method includes setting a heat assisted magnetic recording (HAMR) device located in a data storage system having a laser to an operating temperature. A threshold laser current is determined. The threshold laser current is a minimum amount of current needed to output light from the laser. An optimal laser current is determined. The optimal laser current is an amount of current that yields an optimal bit error rate. The threshold laser current and the optimal laser current are stored in memory. The steps of determining a threshold laser current, determining an optimal laser current and storing the threshold laser current and the optimal laser current into the calibration table are repeated until acceptable device performance is achieved at more than one operating temperature.

A method includes setting a heat assisted magnetic recording (HAMR) device located in a data storage system having a laser to an operating temperature. An optimal laser current is determined. The optimal laser current is an amount of current that yields an optimal bit error rate. A laser current that corrupts data is determined. The laser current that corrupts data and the optimal laser current are stored in memory. The steps of determining an optimal laser current, determining a laser current that corrupts data and storing the laser current that corrupts data and the optimal laser current into the calibration table are repeated until acceptable device performance is achieved at more than one operating temperature.

During the manufacturing process, a calibration table for a heat assisted magnetic recording (HAMR) device having a laser is created. The calibration table is stored in memory in the data storage system for later access during data storage system operation. The calibration includes determining an amount of current needed to output light from the laser at an operating temperature, determining an amount of current that yields an optimal bit error rate at the same operating temperature and saving the amount of current needed to output light and the amount of current that yields the optimal bit error rate into the calibration table stored in the memory. The steps of determining an amount of current needed to output light from the laser, determining an amount of current that yields an optimal bit error rate and saving the amount of current needed to output light and the amount of current needed to yield optimal bit error rate are repeated until acceptable device performance is achieved at more than one set operating temperature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present disclosure generally related to reading and writing of data with a heat assisted magnetic recording (HAMR) device. This technology, also referred to as thermally-assisted recording (TAR), thermally-assisted magnetic recording (TAMR), energy-assisted magnetic recording (EAMR), etc., uses an energy source such as a laser to heat a small spot on a magnetic disc during recording. The power output of a laser diode in a HAMR device is temperature sensitive. In addition, the read/write performance of a HAMR device is sensitive to laser current input and fly height. A heater is used to compensate for laser-induced writer protrusion. Because the laser is temperature sensitive, the heater will be used differently at different temperatures to maintain a constant fly height. This disclosure describes methods to calibrate laser efficiency changes and fly height changes caused by variations in temperature in order to have optimum drive performance across a range of temperatures. In the calibration process, a table is created during the manufacturing process of a data storage system. The calibration table is stored in memory for later access during normal system operation and is used to compensate for variations in environmental temperatures to which a HAMR or other device is exposed.

Figure 1:
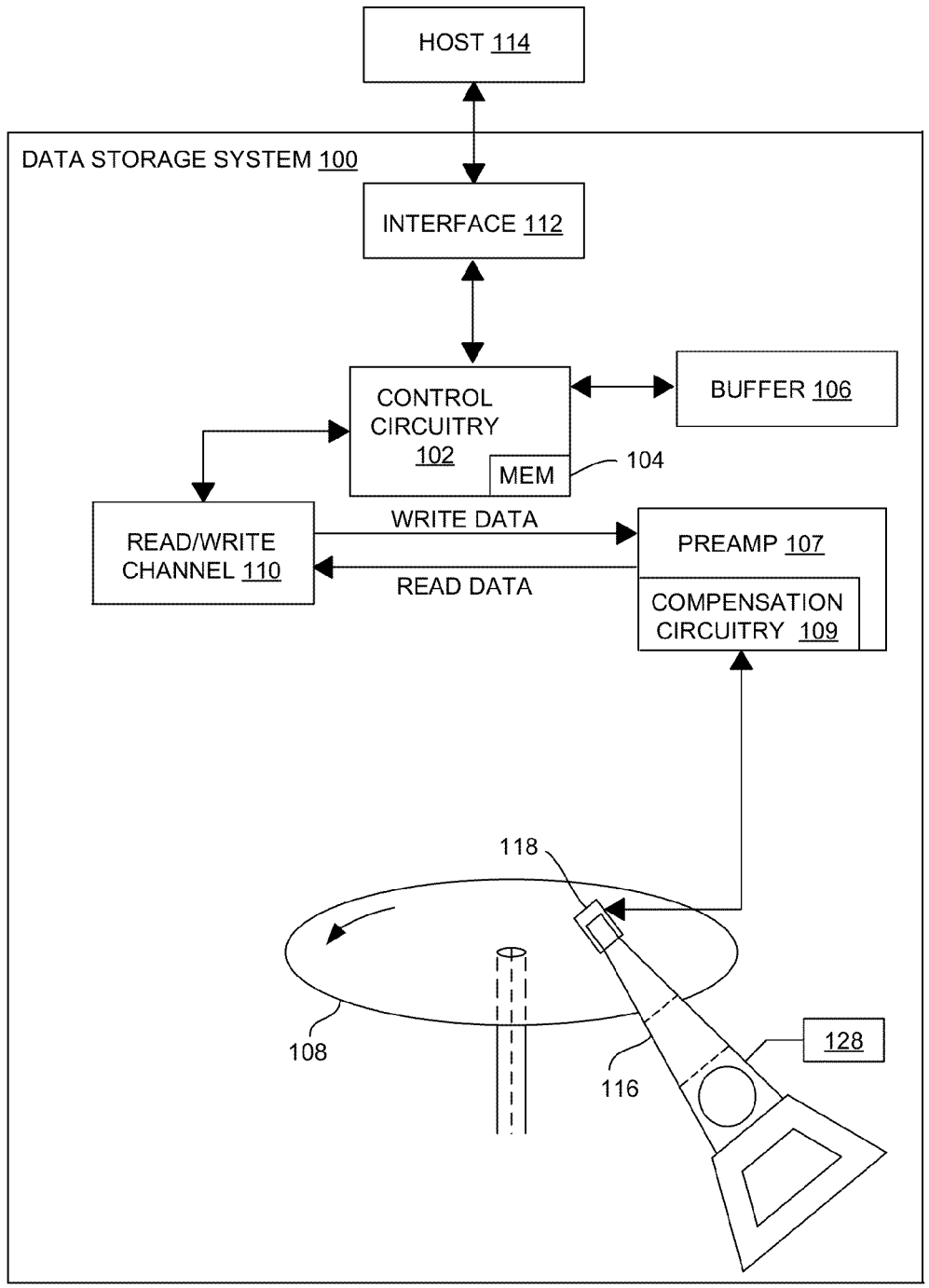
FIG. 1 is a schematic diagram of exemplary components of a data storage device including a head stack assembly and a medium.

FIG. 1 is a simplified block diagram of an exemplary data storage system 100 that can be used in embodiments described herein. Data storage device 100 includes control circuitry 102, which is used for controlling operations of data storage device 100 with the use of programming stored in memory 104. Control circuitry 102 may be coupled to a buffer 106. Buffer 106 can temporarily store user data during read and write operations and may include the capability of temporarily storing access operations pending execution by control circuitry 102.

Data storage system 100 includes storage medium or magnetic recording medium (i.e., disc) 108 and a suspension 116 supporting a transducer 118 (in this case a HAMR transducer or device) that can read and write data to medium 108. In the embodiment illustrated in FIG. 1, the storage medium 108 is illustrated as being a rotatable disc. Data storage system 100 also includes a preamplifier (preamp) 107 for generating a write signal applied to transducer 118 during a write operation, and for amplifying a read signal emanating from transducer 118 during a read operation. In some embodiments, the preamp 107 also includes compensation circuitry 109.

Control circuitry 102 executes read and write operations on data storage medium 108. These read/write operations executed by control circuitry 102 may be performed directly on data storage medium 108 or through read/write channel 110. Read/write channel 110 receives data from control circuitry 102 during a write operation, and provides encoded write data to data storage medium 108 via preamp 107. During a read operation, read/write channel 110 processes a read signal via preamp 107 in order to detect and decode data recorded on data storage medium 108. The decoded data is provided to control circuitry 102 and ultimately through an interface 112 to an external host 114.

External host 114 contains logic (e.g., a processor) capable of issuing commands to data storage device 100. Although FIG. 1 illustrates external host 114 as being a single host, data storage device 100 can be connected through interface 112 to multiple hosts. Via interface 112, data storage system 100 receives data and commands from external host 114 and can provide data to external host 114 based on commands executed by control circuitry 102.

Figure 2:
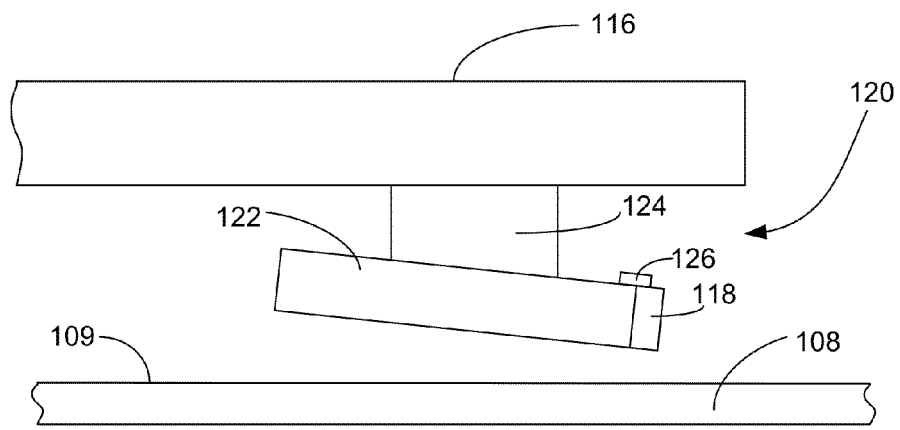
FIG. 2 is a schematic diagram of a side view of a head gimbal assembly (HGA).

FIG. 2 illustrates an enlarged side view of a head gimbal assembly (HGA) 120 illustrating a suspension 116 supporting a slider 122 by a gimbal 124. Slider 122 includes transducer 118, which is rotatable relative to suspension 116 via gimbal 124. Transducer 118 is located at a trailing edge of slider 122 and is held proximate to surface 109 of medium 108 for reading and writing data. Transducer 118 includes a magnetic writer coil (not illustrated), a reader (not illustrated) and an optical near field transducer (NFT) 129, which is described below.

A HAMR transducer, such as transducer 118, uses an energy source to locally heat a small portion of a recording medium to overcome superparamagnetic effects that limit the areal data density of a magnetic medium, such as medium 108. The heating of the medium raises a region of the medium's temperature above a set temperature, allowing for it to be magnetized by a magnetic writer. The medium quickly cools as it rotates away from the energy source and therefore magnetically freezes the written pattern for stable, long-term storage of data.

Figure 3:
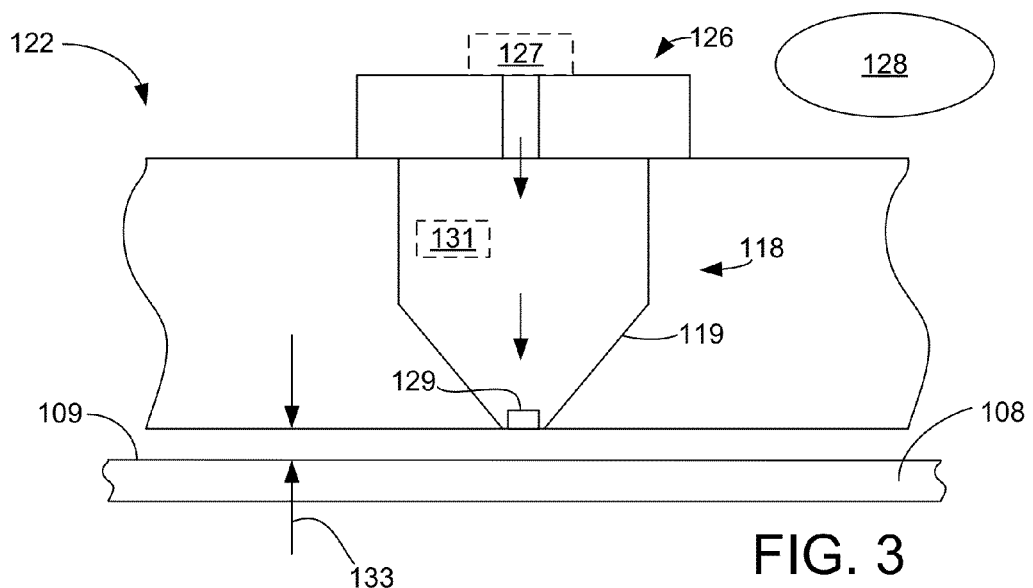
FIG. 3 illustrates an enlarged diagram of a trailing end of a slider of the HGA illustrated in FIG. 2.

FIG. 3 illustrates an enlarged diagram of a trailing end of slider 122. HAMR transducer 118 may include optical components, such as an optical wave guide 119, that direct, concentrate and transform light energy from a laser assembly 126 to heat medium 108. Laser assembly 126 includes a laser diode that receives a current input and applies laser energy onto medium 108 through optical wave guide 119. The HAMR medium hot spot may need to be smaller than the diffraction limit of light. One way to achieve such small hot spots is to use an optical near field transducer (NFT) 129.

One side effect of NFT 129 is that heat from the laser diode causes NFT 129 to expand. This expansion causes the air bearing surface adjacent the transducer to protrude. However, the air bearing surface must be maintained at a constant fly height 133. Therefore, during normal data storage system operation, heater power will need to be adjusted to maintain that constant fly height and the amount of adjustment that is needed is dependent on the operating temperature and laser current efficiency.

Control of the applied laser energy in a HAMR device is essential to performance. If the heat energy imparted to the medium 108 is too low then medium 108 is not sufficiently heated, and the recorded signal is of a poor quality. If the energy is too high, the recorded signal of adjacent tracks may be partially erased. Moreover, the energy can change even if the current of the heat energy is constant. For example, the laser energy for a given laser current varies with temperature and also varies with other effects, such as with laser diode aging or other component aging. Also, as components age, the amount of applied laser current needed to achieve the same degree of media heating may vary.

In one embodiment, laser diode input current may be controlled by a register in preamplifier 107 (FIG. 1). Preamplifier 107 contains a digital-to-analog converter (DAC) to convert the programmed register value into an applied current. The laser energy output from transducer 118 (FIGS. 2 and 3) onto medium 108 can vary. Even if the current to the laser diode is accurate and constant, the power output from the laser diode may not. For example, a forward voltage drop of the laser diode can cause this relationship to vary. In addition, the preamplifier's applied current may not always be accurate and may also vary. Temperature has a strong effect on all of these variations.

There are two important aspects of laser diode output and they are included in the disclosed calibration table created during the manufacturing process of data storage system to maintain reliable drive operation. They are laser threshold current ($I_{THR}$), which is a minimum amount of applied current required to make the laser diode output light (i.e., the current when the laser starts lasing), and the total required laser current for optimal read/write performance ($I_{OPT}$). $I_{THR}$ is important for maintaining write and pre-write protrusion clearance because when the laser current in the drive is set higher than $I_{THR}$, protrusion occurs and must be accounted for to maintain constant clearance of fly height with respect to the media. During pre-write, the laser is "warmed-up" to a value that may be higher than $I_{THR}$ depending on environmental temperatures. Therefore, the warm up current can influence write clearance, and knowledge of $I_{THR}$ is required for proper compensation of laser protrusion using a heater to adjust fly height. $I_{OPT}$ is the total laser current for maintaining read/write performance and influencing the write clearance since the amount of $I_{OPT}$ beyond $I_{THR}$ is the laser current that causes protrusion, which must be compensated by the heater as described above. The operating current ($T_{OP}$) is the current needed to reduce the medium coercivity for the magnetic write current to flip the bits in the medium.

A third aspect of laser output is the amount of laser current required to corrupt data ($I_{ERA}$). The applied laser current must be kept below $I_{ERA}$ plus an adequate safety margin to ensure that no data is erased when the head is not writing. A certain amount of laser current may be applied before writing to "warm up" the laser and reduce dynamics at the start of the write when full current is applied. This "warm up" current must also be kept below $I_{ERA}$.

There are two parameters that are critical to drive quality—the bit error rate (BER) of the written track on the media and the degradation imparted to adjacent tracks (adjacent track interference or ATI) by the write operation. Changes in laser power impact both of these parameters. Unfortunately, to perform BER and ATI measurements well, many revolutions of writing are required. In addition, experimentally performing these measurements may cause degradation to the data on adjacent tracks. Therefore, BER and ATI measurements are not practical to perform on a frequent basis while the drive is in normal operation.

Two parameters that can be sensed include temperature and laser output power. Temperature can be sensed periodically using a thermistor 128, for example. Laser output power can also be sensed in real-time, for example, with a sensor such as a photodiode 127 or, in another embodiment, bolometer 131, which is a detector that changes light into temperature. In the embodiment illustrated in FIG. 3, photodiode 127 can be, in one embodiment, part of laser assembly 126, which can be manufactured on each transducer and can be used to measure the laser power or energy within the recording head. The arrow within transducer 118 in FIG. 3 illustrates the path of laser energy through optical wave guide 119 from laser assembly 126 to NFT 129. As shown, laser energy emanates from laser assembly 126 and energy from NFT 129 heats a portion of medium 108. In an alternative embodiment, bolometer 131 can be coupled to optical wave guide 119 and may also measure laser output power in recording head 118.

There are three general modes of operation for the laser diode in a HAMR drive. When idle, the diode is fully off or inactive (no applied current). When writing data, the diode is fully on or active with an applied current sufficient to record or erase data to medium 108. In preparation for writing, the laser diode is partially on or biased with a current insufficient to record or erase data to medium 108.

Figure 4:
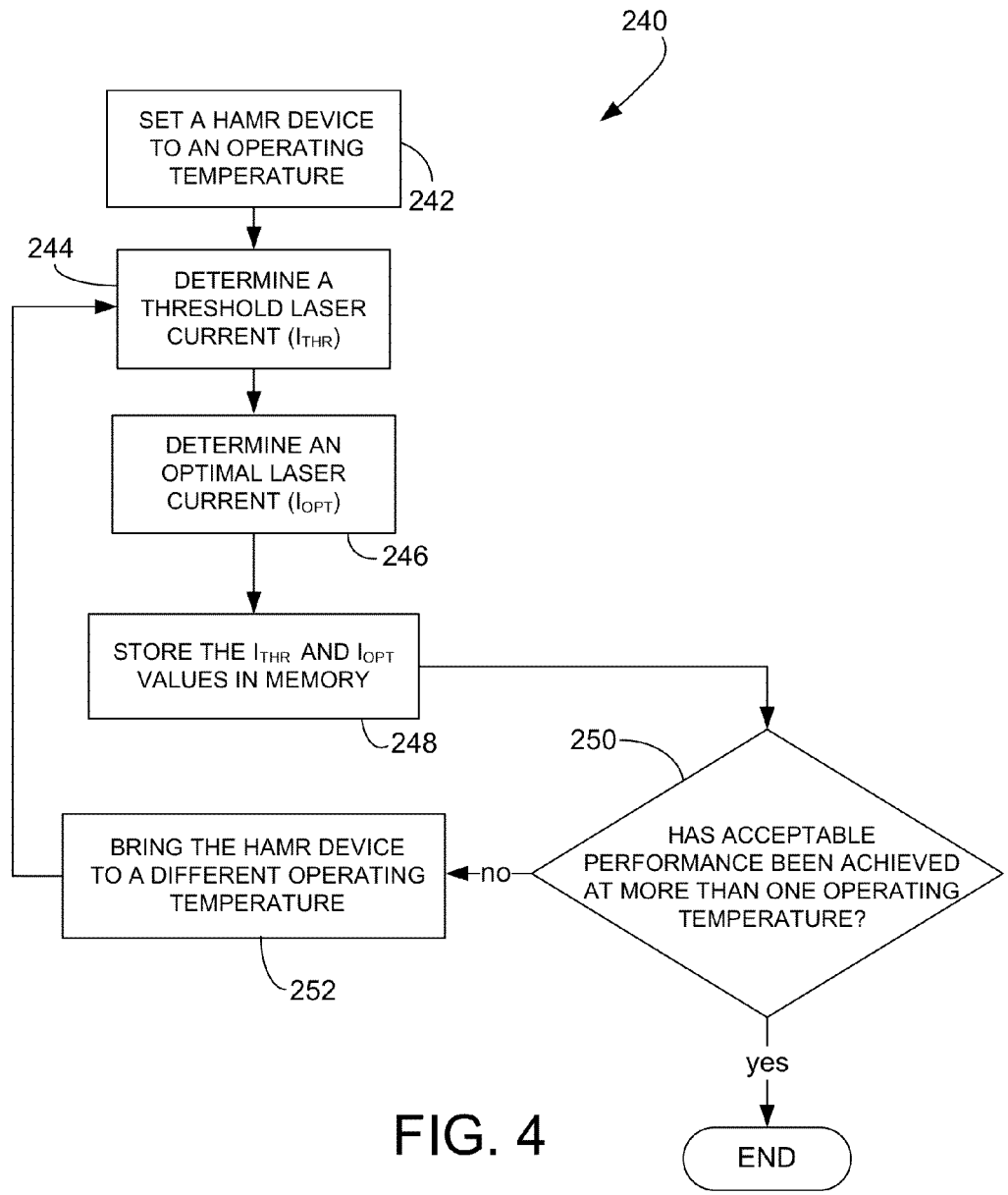
FIG. 4 is a block diagram illustrating a method of creating a calibration table for a laser in a HAMR device during the manufacturing process according to one embodiment.

FIG. 4 is a block diagram 240 illustrating a method of creating a calibration table for a laser in HAMR device 118 during the manufacturing process according to one embodiment. At block 242, HAMR device 118 is set at an operating temperature. The operating temperature can be at any environmental temperature that is within a range of temperatures that the data storage system would need to operate in during normal operation. At block 244, a threshold laser current ($I_{THR}$) is determined. $I_{THR}$ is the minimum current at which laser diode 126 starts to output light or begins to lase. The following methods illustrated in FIGS. 6A, 6B, and 6C are exemplary ways of determining threshold laser current.

Figure 5:
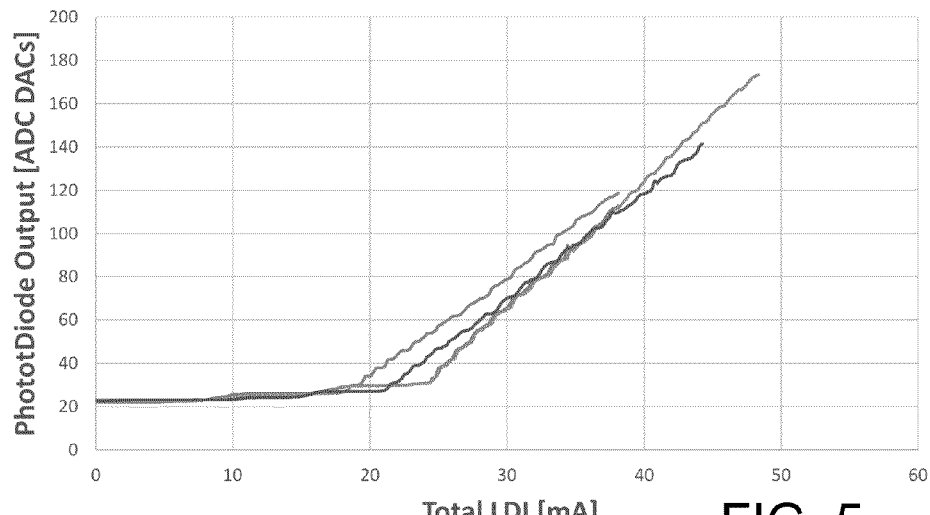
FIG. 5 is an exemplary graphical representation illustrating the relationship of applied laser current to sensed laser output power at different operating temperatures.

FIG. 5 is an exemplary graphical representation illustrating the relationship of applied laser current to sensed laser output power at different operating temperatures. As illustrated, HAMR device 118 begins outputting laser power or light at a threshold point. That threshold point differs depending on the operating temperature of HAMR device 118. FIG. 6A is a block diagram 244a illustrating a method of determining a threshold laser current ($I_{THR}$) in HAMR device 118 during the manufacturing process according to one embodiment. FIG. 6B is a block diagram 244b illustrating a method of determining threshold laser current ($I_{THR}$) in HAMR device 118 during the manufacturing process according to another embodiment. FIG. 6C is a block diagram 244c illustrating a method of determining threshold laser current ($I_{THR}$) in HAMR device 118 during the manufacturing process according to another embodiment.

Figure 6A:
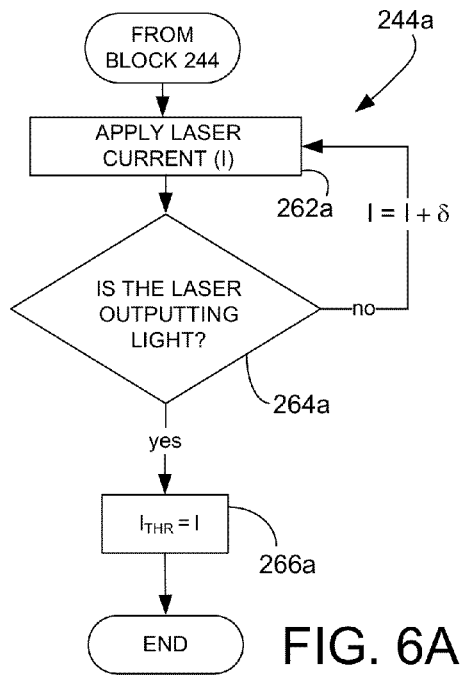
FIG. 6A is a block diagram illustrating a method of determining a threshold laser current ($I_{THR}$) in a HAMR device during the manufacturing process according to one embodiment.

At block 262a in FIG. 6A, laser current (I) is applied to laser diode 126. At block 264a, it is determined whether laser diode 126 is outputting light at the applied laser current I. If yes, the method passes to block 266a and the applied laser current I is captured as the threshold current ($I_{THR}$) in the calibration table. If no, the method increases the applied laser current by a constant, such as constant δ, and returns to block 262a to apply laser current I to laser diode 126. One exemplary constant δ is 0.275 mA. However, other values can be used and could change based on the preamp 107. The method continues to increase the applied laser current I by constant δ until laser diode 126 outputs light. This light can be detected, for example, by photodiode or photodetector 127.

Figure 6B:
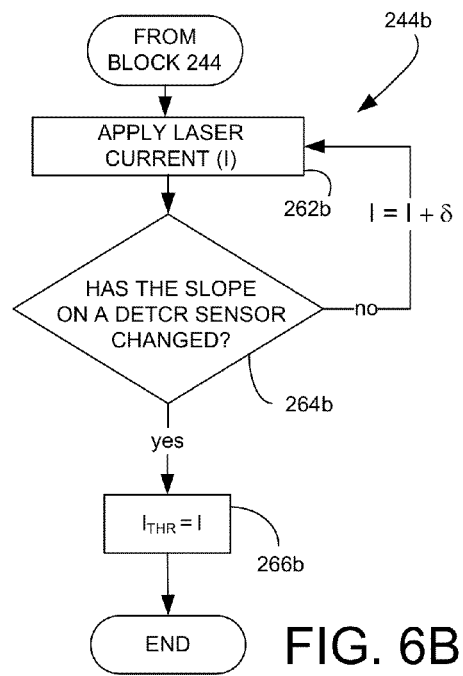
FIG. 6B is a block diagram illustrating a method of determining threshold laser current ($I_{THR}$) in a HAMR device during the manufacturing process according to another embodiment.
Figure 6C:
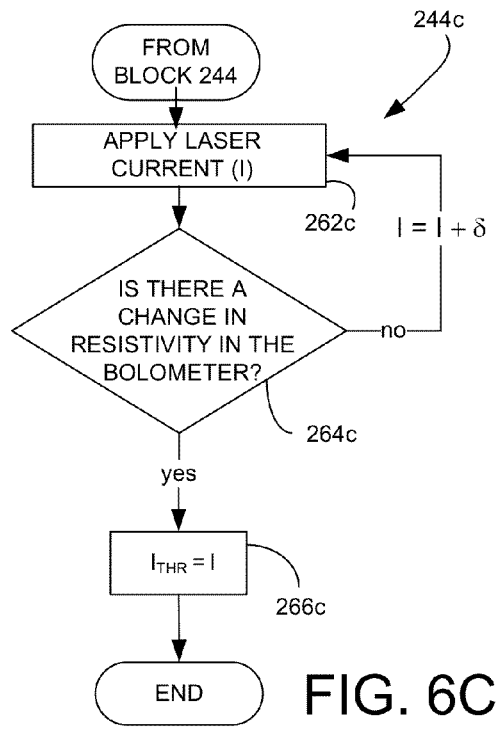
FIG. 6C is a block diagram illustrating a method of determining threshold laser current ($I_{THR}$) in a HAMR device during the manufacturing process according to yet another embodiment

In the alternative FIG. 6B embodiment, at block 262b, laser current I is applied to laser diode 126. At block 264b, it is determined whether a slope of DC voltage on a dual-ended temperature coefficient of resistance (DETCR) sensor (not illustrated in FIG. 3) changes due to an output of NFT 129 that increases temperature at the air bearing surface of slider 122. If yes, the method passes to block 266b and the applied laser current I is captured and saved as the threshold current ($I_{THR}$). If no, the method increases the applied laser current by a constant, such as constant δ, and returns to block 262b to apply laser current I to laser diode 126. One exemplary constant δ is 0.275 mA. However, other values can be used and could change based on the preamp 107. The method continues to increase the applied laser current I by constant δ until the slope of DC voltage on the DETCR sensor changes.

In the alternative FIG. 6C embodiment, at block 262c, laser current I is applied to laser diode 126. At block 264c, it is determined if there has been a change in resistivity in a bolometer, such as bolometer 131. If yes, the method passes to block 266c and the applied laser current I is captured and saved as the threshold current ($I_{THR}$). If no, the method increases the applied laser current by a constant, such as constant δ, and returns to block 262c to apply laser current I to laser diode 126. One exemplary constant δ is 0.275 mA. However, other values can be used and could change based on the preamp 107. The method continues to increase the applied laser current I by constant δ until a change in resistivity in bolometer 131 is detected.

With reference back to block diagram 240 of FIG. 4, after $I_{THR}$ is determined at block 244, the method passes to block 246 and determines an optimal laser current ($I_{OPT}$). $I_{OPT}$ is an amount of current applied to laser diode 126 that yields an optimal bit error rate (BER). The following method illustrated in FIG. 8 is an exemplary way of determining optimal laser current.

Figure 7:
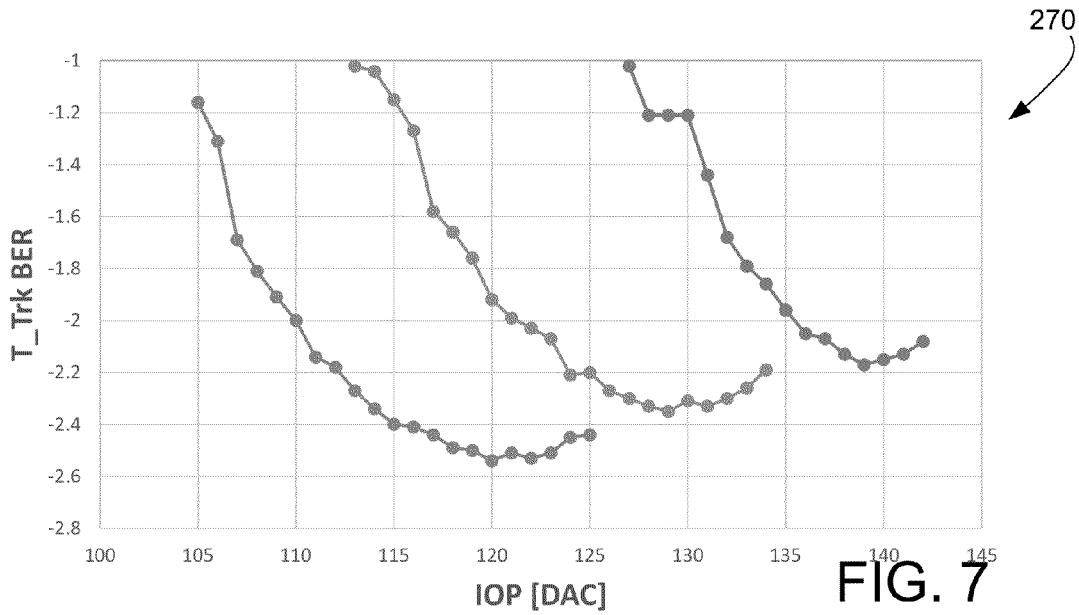
FIG. 7 is an exemplary graphical representation illustrating the relationship of operating laser current to bit error rate (BER) at different operating temperatures.

FIG. 7 illustrates a graphical representation illustrating the relationship of operating laser current to bit error rate (BER) at different operating temperatures. As illustrated in the graphical representation, the minimum of each curve represents the optimal laser current where optimal BER is achieved. In other words, to determine $I_{OPT}$, BER is monitored as applied laser current is increased and, when the BER reaches a minimum, the applied laser current is captured as the optimal laser current ($I_{OPT}$) in the calibration table. Still in other words, $I_{OPT}$ is where BER of data written to a sector on a medium is at a minimum across a plurality of applied laser currents.

Figure 8:
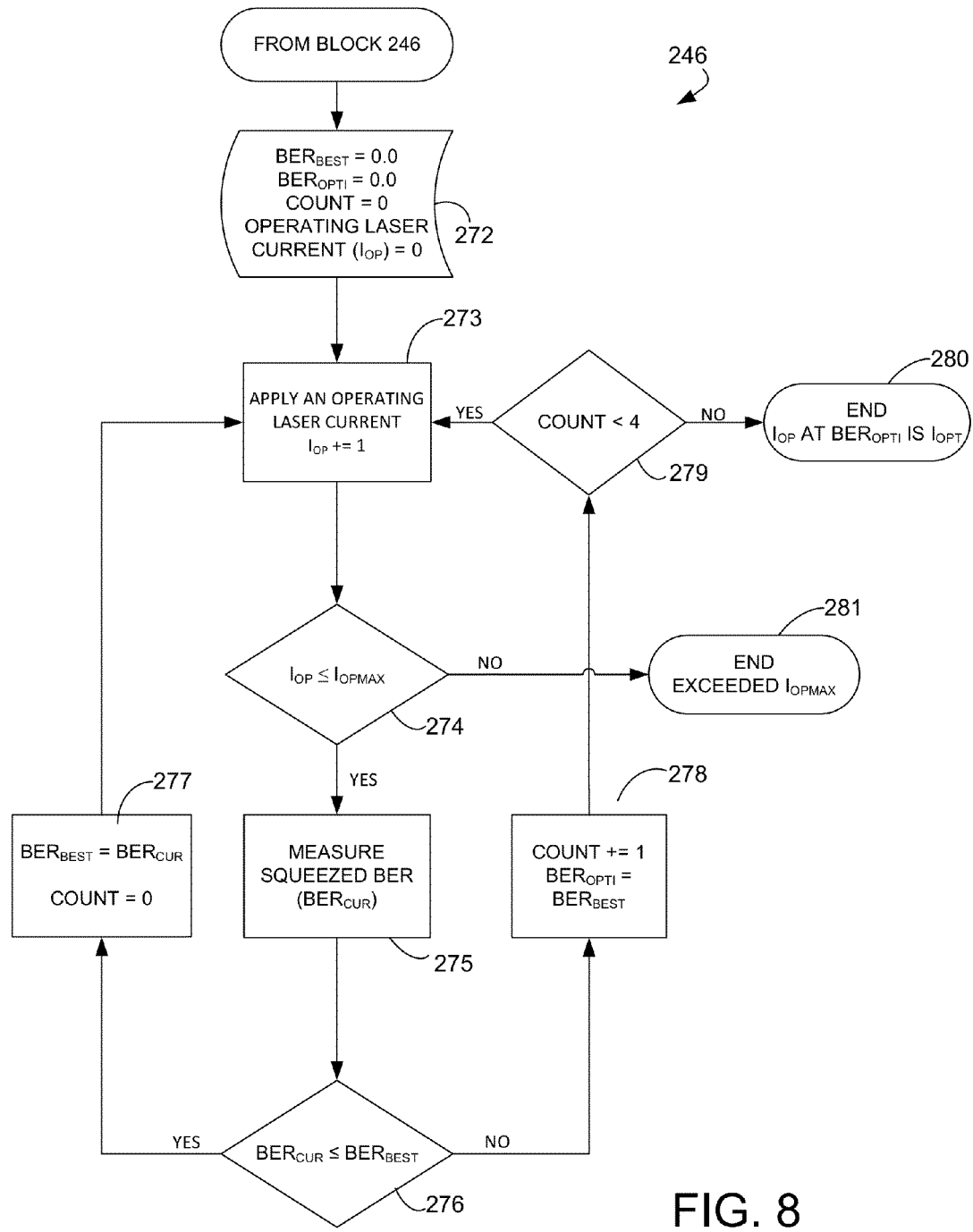
FIG. 8 is a block diagram illustrating a method of determining optimal laser current in a HAMR device during the manufacturing process according to one embodiment.

One way to make this determination is shown in FIG. 8. FIG. 8 is a block diagram 246 illustrating a method of determining optimal laser current in HAMR device 118 during the manufacturing process according to one embodiment. At block 272, the best bit error rate (BER) is set to 0, the optimal BER is set to 0, the count is set to 0 and operating current ($I_{OP}$) is set to 0. The $I_{OP}$ is increased by one at block 273 and the method passes to block 274 to determine if the new $I_{OP}$ is less than or equal to the maximum operating current. If yes, the method passes to block 275. If no, the method passes to block 281 where the method ends because the maximum operating current has been exceeded. At block 275, a squeezed BER (i.e., a current BER) is measured. At block 276, the current BER is compared to the best BER. If the current BER is less than or equal to the best BER, then the method passes to block 277 where the best BER is set equal to the current BER. The method passes back to block 273 where $I_{OP}$ is increased by one and the steps of measuring BER are performed again. If the current BER is greater than the best BER, the method passes to block 278 where the count is increased by one and the optimal BER is set equal to the best BER. At block 279, if the count is less than 4, the method returns to block 273 where $T_{OP}$ is increased by one and the steps of measuring BER are performed again. If, however, the count is greater than 4 in block 279, the method ends at block 280 wherein the $I_{OP}$ at the optimum BER is the $I_{OPT}$.

With reference back to block diagram 240 of FIG. 4, after $I_{OPT}$ is determined at block 246, the method passes to block 248 where $I_{THR}$ and $I_{OPT}$ values are stored with the operating temperature into a calibration table, which is saved in memory, such as non-volatile memory, in the data storage system. After the values are stored, the method passes to block 250 to determine whether acceptable performance has been achieved at more than one operating temperature. Acceptable performance may be determined using BER and ATI. If yes, the method ends and the values stored in the calibration table are extrapolated for operating temperatures other than the operating temperatures tested. This can be done by performing curve fitting or other types of extrapolation formulas. If no, the method passes to block 252 where HAMR device 118 is brought to a different operating temperature other than the operating temperature being used. Steps 244, 246 and 248 are repeated until acceptable device performance is achieved at more than one operating temperature.

Figure 9:
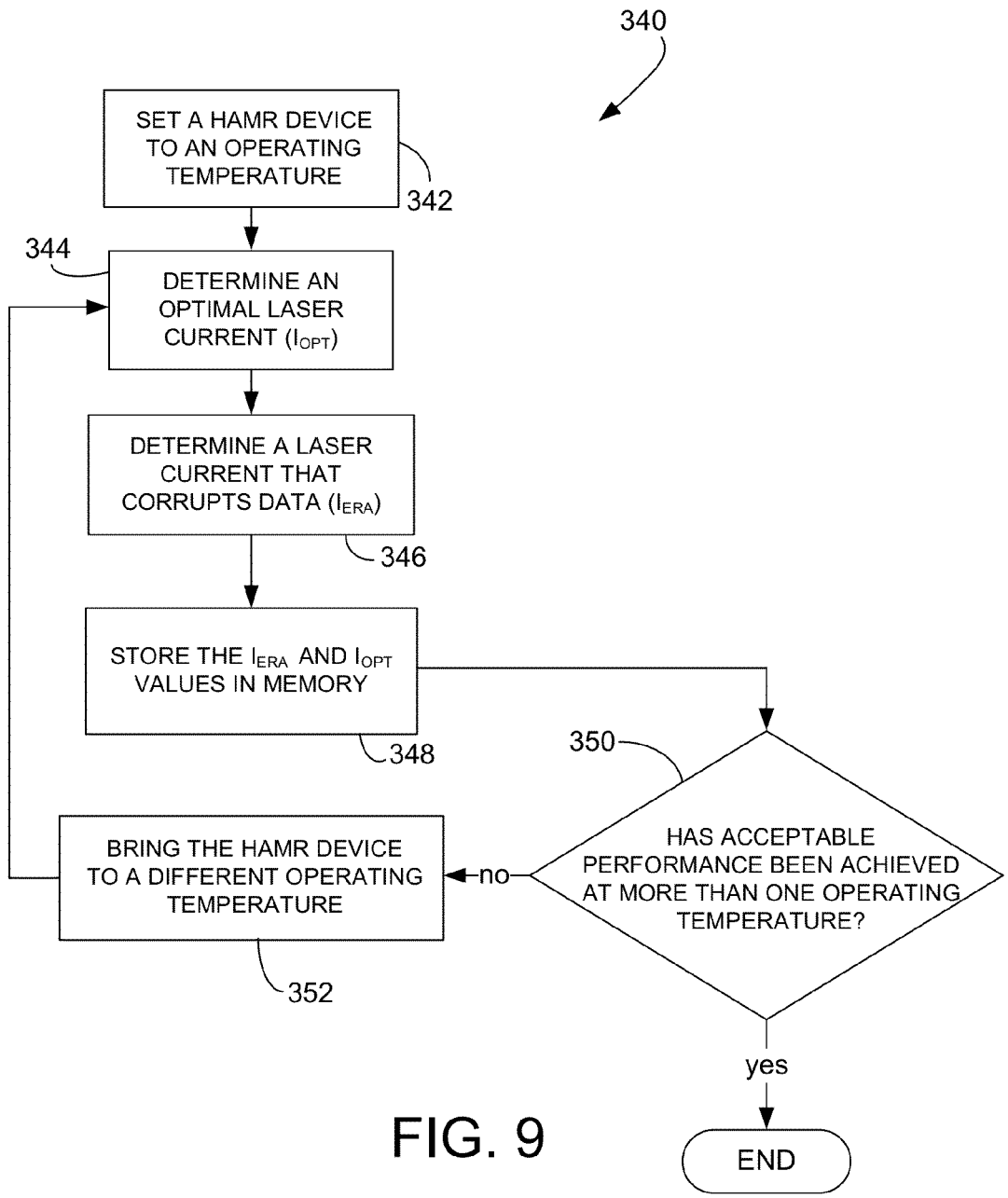
FIG. 9 is a block diagram illustrating a method of creating a calibration table for a laser in a HAMR device during the manufacturing process according to another embodiment.

FIG. 9 is a block diagram 340 illustrating a method of creating a calibration table for a laser in HAMR device 118 during the manufacturing process according to another embodiment. In this embodiment, threshold laser current is unavailable for a variety of reasons. For example, the photodiode 127 and/or DECTR sensor are not working or are not included in head 118. At block 342, HAMR device 118 is set at an operating temperature. The operating temperature can be at any environmental temperature that is within a range of temperatures that the data storage system would need to operate in during normal operation. At block 344, an optimal laser current ($I_{OPT}$) is determined. $I_{OPT}$ is an amount of current applied to laser diode 126 that yields an optimal bit error rate (BER). The method illustrated and described above in FIG. 8 is an exemplary way of determining optimal laser current. After $I_{OPT}$ is determined, the method passes to block 346 and determines a laser current that corrupts or erases data ($I_{ERA}$). The following method illustrated in FIG. 11 is an exemplary way of determining laser current that corrupts or erases data.

Figure 10:
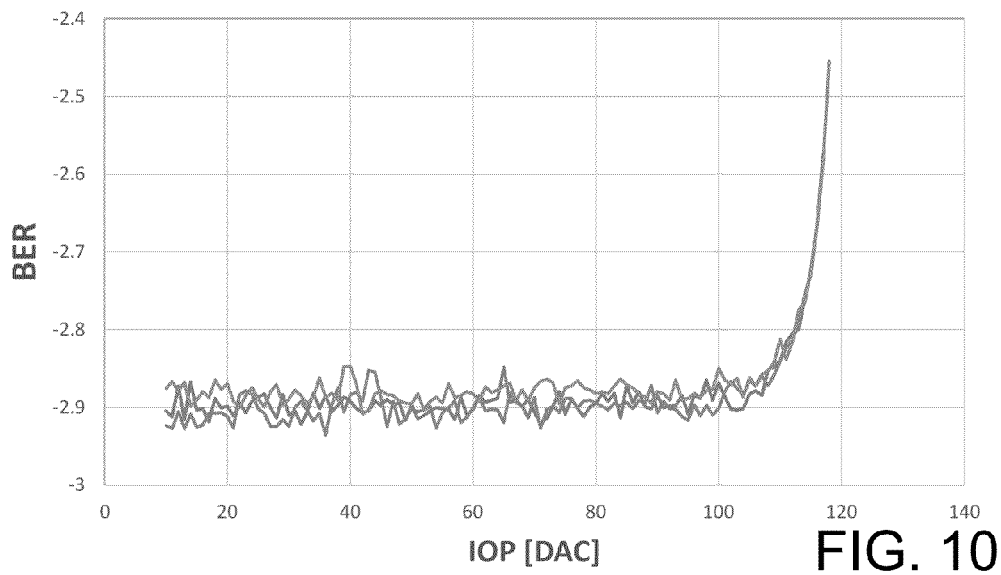
FIG. 10 is an exemplary graphical representation illustrating the relationship of erasing laser current to bit error rate (BER) and at what operating laser current corrupts data.

FIG. 10 is an exemplary graphical representation illustrating the relationship of erasing laser current to bit error rate (BER) and at what operating laser current data is corrupted. As illustrated, HAMR device 118 outputs laser power or light and at some point the measured BER of a data track written with data reaches a point that indicates that data is being corrupted. That threshold point differs depending on the operating temperature of HAMR device 118.

Figure 11:
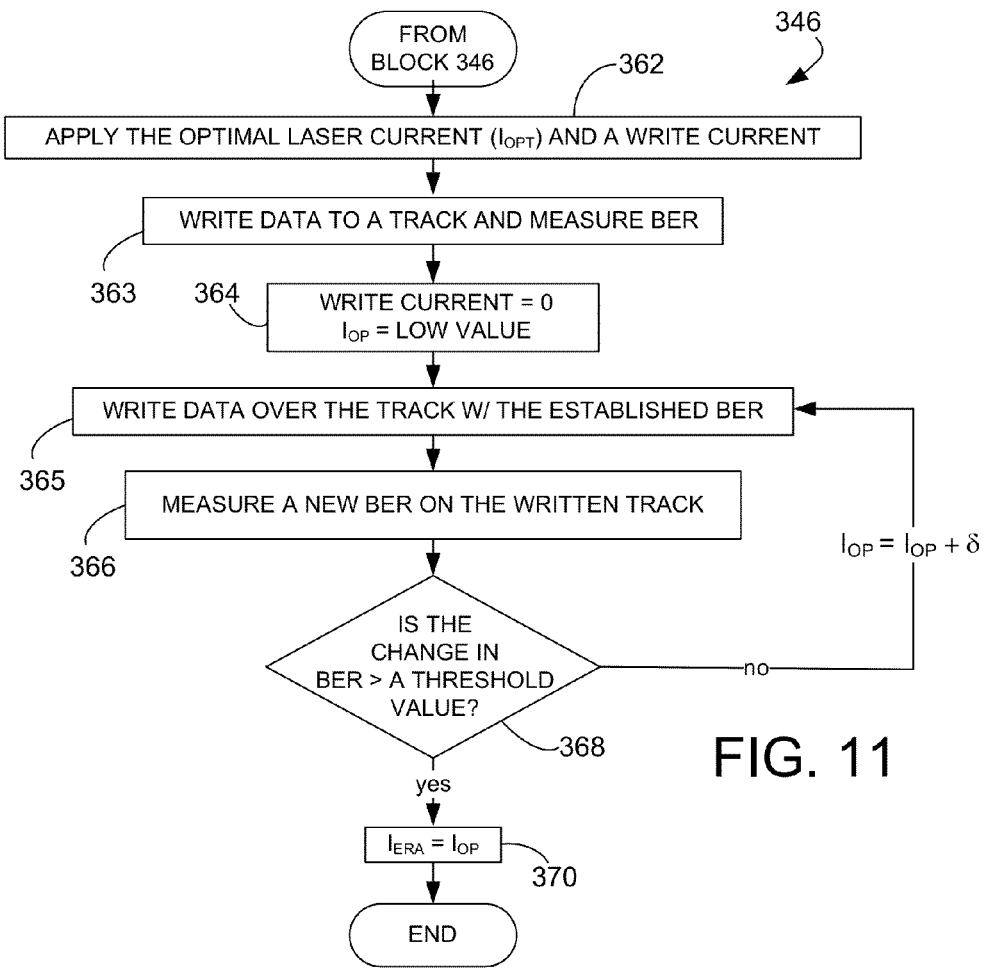
FIG. 11 is a block diagram illustrating a method of determining laser current in a HAMR device that corrupts data during the manufacturing process of the data storage system.

FIG. 11 is a block diagram 344 illustrating a method of determining laser current in a HAMR device during the manufacturing process that corrupts or erases data ($I_{ERA}$). At block 362, the optimal laser current $I_{OPT}$ that was determined in block 344 and a write current is applied to laser diode 126. At block 363, data is written to a track and bit error rate (BER) is measured. At block 364, the write current is set at 0 and an operating current ($I_{OP}$) is set to a low value. At block 365, data is written over the data track with the established BER from block 363. At block 366, a new BER is measured from the new data written on the data track. At block 368, the method determines if the change in BER or difference in BER from the newly measured to the established is greater than a threshold value. For example, the threshold value can be 0.15. If yes, the method passes to block 370 where the $I_{OP}$ is captured as $I_{ERA}$. If no, the $I_{OP}$ applied is increased by a constant, for example a constant $\delta$, and the new $I_{OP}$ is applied to laser diode 126 at block 278 so as to again write data to a data track with an established BER and measure the new BER of the written track. One exemplary constant $\delta$ is 0.275 mA. However, other values can be used and could change based on the preamp 107. Steps 362, 364 and 366 are repeated until a change in the new BER from the established BER is greater than a threshold value.

With reference back to block diagram 340 of FIG. 9, at block 348, $I_{OPT}$ and $I_{ERA}$ values are stored with the set operating temperature into a calibration table, which is saved in memory, such as non-volatile memory, in the data storage system. After the values are stored, the method passes to block 350 to determine whether acceptable performance has been achieved at more than one operating temperature. Acceptable performance may be determined using BER and ATI. If yes, the method ends and the values stored in the calibration table are extrapolated for operating temperatures other than the temperatures tested. This can be done by performing curve fitting or other types of extrapolation formulas. If no, the method passes to block 352 where HAMR device 118 is brought to a different operating temperature other than the operating temperature being used. Steps 344, 346 and 348 are repeated until acceptable device performance is achieved at more than one operating temperature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    setting a heat assisted magnetic recording (HAMR) device located in a data storage system having a laser to an operating temperature;
    determining a threshold laser current, wherein the threshold laser current is a minimum amount of current needed to output light from the laser;
    determining an optimal laser current, wherein the optimal laser current is an amount of current that yields an optimal bit error rate (BER) and minimum adjacent track interference (ATI);
    storing the threshold laser current and the optimal laser current in memory; and
    repeating the steps of determining the threshold laser current and determining the optimal laser current and storing the threshold laser current and the optimal laser current into a calibration table until acceptable device performance is achieved at more than one operating temperature.

2. The method of claim 1, further comprising extrapolating threshold laser currents and optimal laser currents from the saved threshold laser current and optimal laser current values for operating temperatures other than the more than one operating temperature used.

3. The method of claim 1, wherein determining the threshold laser current comprises:
    applying laser current to the laser;
    increasing the applied laser current until a photo detector detects the laser outputting light; and capturing the applied laser current when the photo detector detects the laser outputting light as the threshold laser current.

4. The method of claim 1, wherein determining the threshold laser current comprises:
applying laser current to the laser;
increasing the applied laser current until a slope of DC voltage on a dual-ended temperature coefficient of resistance (DETCR) sensor changes due to a near field transducer (NFT) output increasing a temperature at the air bearing surface; and
capturing the applied laser current when the slope of the DC voltage on the DETCR changes as the threshold laser current.

5. The method of claim 1, wherein determining the threshold laser current comprises:
applying laser current to the laser;
increasing the applied laser current until a change in resistivity on a bolometer occurs; and
capturing the applied laser current when the slope of the DC voltage on the DETCR changes as the threshold laser current.

6. The method of claim 1, wherein determining the optimal laser current comprises:
monitoring bit error rate (BER) as operating laser current is increased; and
capturing the operating laser current where optimal BER occurs as the optimal laser current.

7. The method of claim 6, wherein determining optimal laser current comprises determining where BER of data written to a track on a medium is at a minimum across a plurality of different currents.

8. The method of claim 1, wherein the steps of setting the HAMR device to an operating temperature, determining a threshold laser current, determining an optimal laser current, storing the threshold laser current and the optimal laser current in memory and the repeating steps are performed during the manufacturing process of the data storage system.

9. The method of claim 8, further comprising adjusting heater power of the HAMR device during normal operation of the data storage system using the data saved in memory.

10. A method comprising:
setting a heat assisted magnetic recording (HAMR) device located in a data storage system having a laser to an operating temperature;
determining an optimal laser current, wherein the optimal laser current is an amount of current that yields an optimal bit error rate (BER) and a minimum adjacent track interference (ATI);
determining a laser current that corrupts data;
storing the laser current that corrupts data and the optimal laser current in memory; and
repeating the steps of determining an optimal laser current and determining a laser current that corrupts data until acceptable device performance is achieved at more than one operating temperature.

11. The method of claim 10, further comprising extrapolating laser currents that corrupt data and extrapolating optimal laser currents from the saved data for operating temperatures other than the more than one operating temperature used.

12. The method of claim 10, wherein determining the optimal laser current comprises:
monitoring bit error rate (BER) as laser current is increased; and
capturing the laser current where optimal BER occurs.

13. The method of claim 12, wherein determining optimal laser current comprises determining where BER of data written to a track on a medium is at a minimum across a plurality of currents.

14. The method of claim 10, wherein determining the laser current that corrupts data comprises:
applying the optimal laser current and a write current to a track of a medium;
writing data to the track and measuring bit error rate (BER) to get an established BER;
setting the write current to zero and setting the laser current to a low value;
writing data over the track with the established BER;
measuring a new BER;
calculating a change in BER between the established BER and the new BER;
repeating the steps of writing data over the tack with the established BER, measuring the new BER and calculating the change in BER between the established BER and the new BER at an increased laser current value until the change is larger than a threshold value; and
capturing the laser current as the laser current that corrupts data.

15. A method comprising:
creating a calibration table for a heat assisted magnetic recording (HAMR) device having a laser during data storage system manufacture, the calibration table being stored in non-volatile memory in the data storage system for later access during data storage system operation, wherein creating the calibration table comprises:
determining a minimum amount of current needed to output light from the laser at an operating temperature;
determining an amount of current that yields an optimal bit error rate at the same operating temperature;
saving the amount of current needed to output light and the amount of current that yields the optimal bit-error rate into the calibration table stored in the non-volatile memory; and
repeating the steps of determining the minimum amount of current needed to output light from the laser and determining the amount of current that yields an optimal bit error rate and saving the amount of current needed to output light and the amount of current needed to yield optimal bit-error rate until acceptable device performance is achieved at more than one operating temperature.

16. The method of claim 15, further comprising determining a laser current that corrupts data and saving the laser current that corrupts data into the calibration table when the amount of current needed to output light from the laser at the more than one operating temperature is unavailable.

17. The method of claim 15, wherein determining the amount of current needed to output light comprises:
applying laser current to the laser;
increasing the applied laser current until a photo detector detects the laser outputting light; and
capturing the applied laser current when the photo detector detects the laser outputting light as the amount of current needed to output light.

18. The method of claim 15, wherein determining the amount of current that yields an optimal bit error rate comprises:
monitoring bit error rate (BER) as laser current is increased; and
capturing the laser current where optimal BER occurs.

19. The method of claim 18, wherein determining the amount of current that yields an optimal bi-error rate comprises determining where BER of data written to a track on a medium is at a minimum across a plurality of currents.

20. The method of claim 15, further comprising adjusting heater power of the HAMR device during normal operation of the data storage system using the data saved in the calibration table.

* * * * *